United States Patent
Divisi

(10) Patent No.: US 10,466,128 B2
(45) Date of Patent: Nov. 5, 2019

(54) OVERPRESSURE INDICATOR

(71) Applicant: DROPSA S.p.A., Milan (IT)

(72) Inventor: Walter Divisi, Monaco (MC)

(73) Assignee: DROPSA S.P.A., Milan (IT)

(*) Notice: Subject to any disclaimer, the term of this patent is extended or adjusted under 35 U.S.C. 154(b) by 245 days.

(21) Appl. No.: 15/711,498

(22) Filed: Sep. 21, 2017

(65) Prior Publication Data
US 2018/0087989 A1  Mar. 29, 2018

(30) Foreign Application Priority Data

Sep. 28, 2016  (IT) .......................... 102016000097477

(51) Int. Cl.
*G01L 1/04* (2006.01)
*G01L 7/16* (2006.01)
(Continued)

(52) U.S. Cl.
CPC ...... *G01L 19/0618* (2013.01); *F16K 37/0008* (2013.01); *G01L 1/042* (2013.01);
(Continued)

(58) Field of Classification Search
CPC ...... F16K 37/00; F16K 37/0008; F01P 11/00; F01P 11/14; F01P 11/18; G01L 1/04;
(Continued)

(56) References Cited

U.S. PATENT DOCUMENTS 3,411,475 A * 11/1968 Sheff .................... B01D 35/143
  116/272
3,677,089 A *  7/1972 Martin ...................... G01L 7/16
  73/744

(Continued)

FOREIGN PATENT DOCUMENTS

EP     1219942 A1     7/2002

OTHER PUBLICATIONS

Search Report and Written Opinion dated May 19, 2017 for Italian patent application No. 102016000097477.

*Primary Examiner* — Nguyen Q. Ha
(74) *Attorney, Agent, or Firm* — Vorys, Sater, Seymour and Pease LLP

(57) ABSTRACT

An over-pressure indicator, including a cup-shaped body having, on its bottom, a hole inside which is sealably housed a mobile element loaded by a spring towards the bottom of the cup-shaped body, the mobile element facing an indicator sensitive part for communication with an area where pressure verification is wanted. The mobile element coupled with a signaller of a movement thereof. The spring pressed by a pre-loading ring nut screwed onto the cup-shaped body. The nut torsionally removably coupled with a calibration cap of the indicator. The calibration cap having at least one stop that, when it abuts against a portion of the cup-shaped body, limits further screwing of the nut thus determining pressure beyond which mobile element movement is allowed. The movement causing intervention of the indicator so by coupling the suitable calibration cap and indicator and screwing it in fully, setting the indicator intervention pressure is possible.

18 Claims, 3 Drawing Sheets

(51) Int. Cl.
*G01L 19/08* (2006.01)
*G01L 19/12* (2006.01)
*G01L 19/06* (2006.01)
*F16K 37/00* (2006.01)
*G01L 7/02* (2006.01)
*G01L 7/08* (2006.01)
*G01L 5/00* (2006.01)
*H01H 35/34* (2006.01)

(52) U.S. Cl.
CPC ............ *G01L 5/0071* (2013.01); *G01L 7/024* (2013.01); *G01L 7/084* (2013.01); *H01H 35/34* (2013.01); *G01L 7/166* (2013.01); *G01L 19/12* (2013.01)

(58) Field of Classification Search
CPC ......... G01L 1/042; G01L 5/00; G01L 5/0071; G01L 7/00; G01L 7/02; G01L 7/024; G01L 7/08; G01L 7/084; G01L 7/16; G01L 7/116; G01L 15/09; G01L 19/0618; G01L 19/00; G01L 19/08–12; G01L 19/12; H01H 35/34
See application file for complete search history.

(56) References Cited

U.S. PATENT DOCUMENTS

| | | | | |
|---|---|---|---|---|
| 3,952,691 | A | * | 4/1976 | Peltz .................. G01L 7/16 116/272 |
| 3,974,795 | A | * | 8/1976 | Crisp, Jr. ............. B01D 35/143 116/267 |
| 4,246,797 | A | * | 1/1981 | Myles .................. G01L 7/16 73/744 |
| 4,517,848 | A | | 5/1985 | Faure |
| 4,546,657 | A | | 10/1985 | Jaeger |
| 4,654,643 | A | | 3/1987 | Meisenheimer, Jr. |
| 6,255,609 | B1 | | 7/2001 | Samuelson et al. |
| 9,677,965 | B2 | * | 6/2017 | Sahara .................. B60C 19/00 |
| 2015/0122354 | A1 | | 5/2015 | Mills et al. |

* cited by examiner

OVERPRESSURE INDICATOR

This claims the benefit of Italian patent application no. 102016000097477, filed Sep. 28, 2016.

FIELD OF THE INVENTION

The present invention relates to an overpressure indicator.

In particular, it relates to an overpressure indicator for lubrication systems.

PRIOR ART

As is known, in order to lubricate mechanical moving parts, lubricant (usually oil or grease) at high pressures must be conveyed. In special cases, working conditions occur in which the pressures involved can range from 50 bar to 500 bar.

A method for verifying that the lubrication is effective and that there is no dispensing discontinuity is to check the pressure on a lubrication line immediately upstream of the mechanical part to be lubricated.

If the pressure exceeds a system design value, this usually means that some element of the circuit is faulty or is not working properly, and the lubricant may not flow in a regular manner. An increase in the operating pressure can also be a symptom of an obstruction at the point of entry of the lubricant itself or a problem that can jeopardize the regular operation of the mechanical part.

SUMMARY OF THE INVENTION

The object of the present invention is to provide an overpressure indicator, in particular for lubrication systems, which makes exceeding a critical operating pressure immediately obvious.

A further object of the invention is to provide an indicator that it is easily adaptable to different operating pressures, reliable and cost-effective compared to those of the prior art.

This and other objects are achieved by an overpressure indicator according to the technical teachings of the appended claims.

BRIEF DESCRIPTION OF THE FIGURES

Further features and advantages of the invention will become apparent from the description of a preferred but non-exclusive embodiment of the device, shown by way of a non-limiting example in the accompanying drawings, in which.

DETAILED DESCRIPTION OF THE INVENTION

Figure 1:
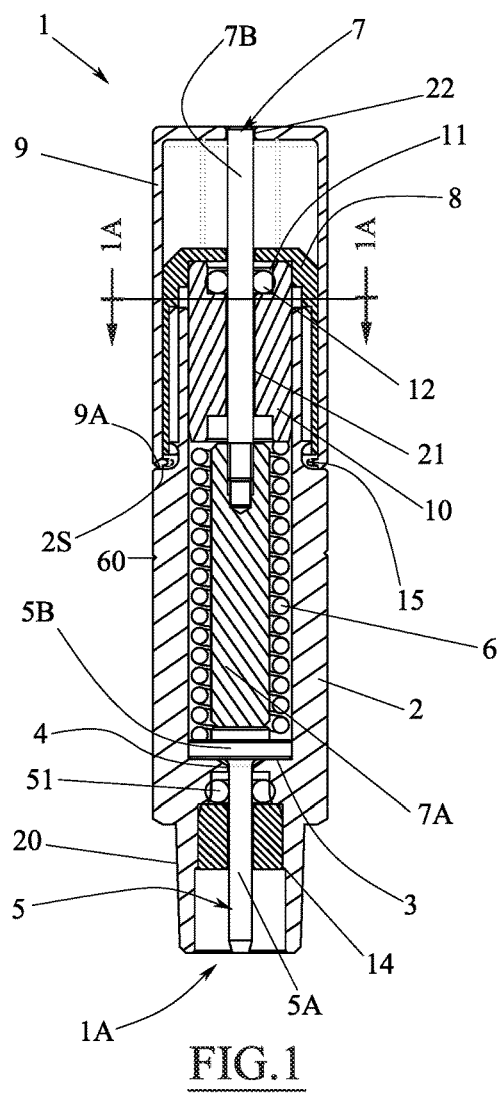
FIG. 1 is an axial sectional view taken along line I-I in FIG. 1A, of an indicator according to the present invention, when it is in a standby status.

With reference to the above figures, an overpressure indicator is shown, globally denoted by reference numeral 1.

The overpressure indicator 1, comprises a cup-shaped body 2 equipped, on its bottom 3, with a hole 4 inside which is sealably housed a mobile element 5 loaded by a spring 6 towards the bottom of the cup-shaped body.

The mobile element 5, which may have a mushroom configuration, may be formed by a piston 5B provided with a stem 5A protruding from the hole 4. The seal between stem 5A and the bottom of the container may be obtained through an O-ring 51 (or other type of seal) provided between a bush 14 guiding the stem 5A and the bottom of the cup-shaped body 2 outside which the bush is mounted (e.g. by interference, gluing, threading or other appropriate method). In the example described, piston 5B moves without seal on the inner surface of cup-shaped body 2.

In particular, the mobile element 5 and specifically its stem 5A is facing (or in any case in direct or indirect mechanical communication) with a sensitive part 1A of the indicator intended to communicate with an area of which one wants to check the pressure.

Advantageously, the indicator may be screwed through a thread 20 surrounding the sensitive part 1A of the indicator, in a threaded hole provided on a pipe 31, 32 under pressure of a lubrication system (which will be described hereinafter). Advantageously, between pipe 31, 32 and indicator 1 it is possible to interpose a sealing element (not shown).

The mobile element 5 can be coupled with a signaller 7 of a movement thereof. In the embodiment described, the signaller may comprise a core 7A housed inside the spring 6 and in contact, at least in a resting position (see FIG. 1), with the piston 5B of the mobile element 5.

Figure 2:
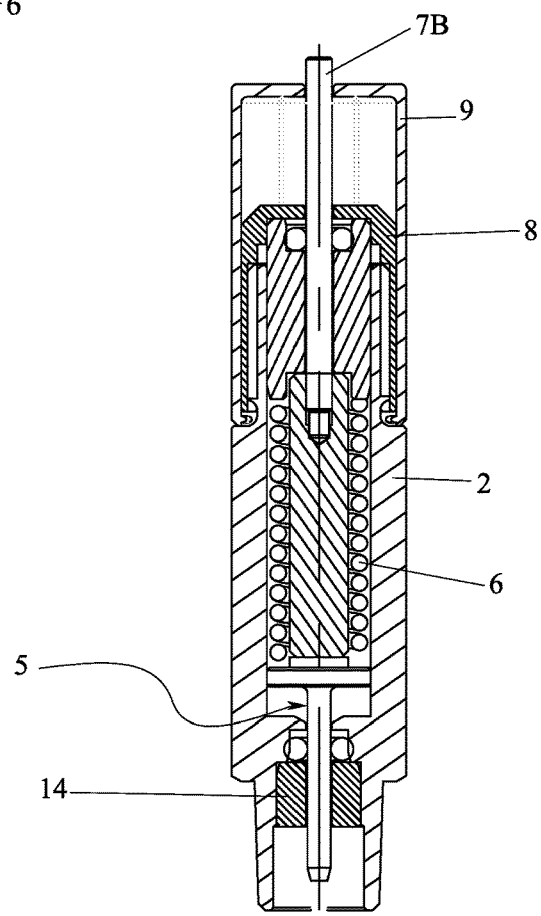
FIG. 2 is an axial section of the indicator in FIG. 1, in an intervention position.
Figure 3:
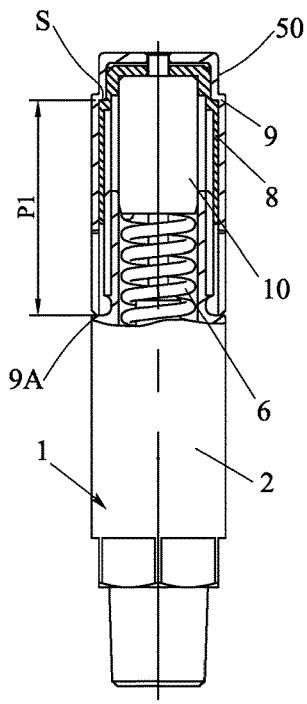
FIGS. 3 to 8 show, in section taken along line III-III in FIG. 1A, different configurations of the indicator to which different calibration caps are associated to adjust the intervention pressure thereof.

The core 7A may be provided with an elongated portion 7B which, at least in an intervention status of the indicator, protrudes from the calibration cap 9 (FIG. 2).

Figure 1A:
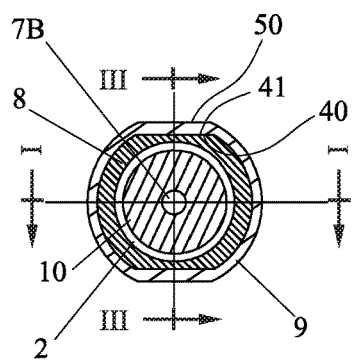
FIG. 1A is a section taken along line 1A-1A in FIG. 1.

As it can be seen in FIG. 1, the spring 6 is pressed by a pre-loading ring nut 8 screwed onto the cup-shaped body 2 and torsionally coupled in a removable manner with an interchangeable calibration cap 9 of the indicator. Advantageously, the torsional coupling between the cap and the ring nut is a shape coupling. Ring nut 8, as shown in FIG. 1A, can be equipped with an outer profile with a double levelling 40, while the inner profile of cap 9 corresponds to that of the ring nut (and therefore also provided with a double levelling 41). Of course, any other type of coupling adapted to ensure a torsional coupling between ring nut and cap may be provided. Moreover, ring nut 8 is provided with a passage 22 for the elongated portion 7B of signaller 7.

Ring nut 8 can act on the spring directly, or through a thrust insert 10, for example as shown in FIG. 1. The thrust insert 10 comprises an axial passage intended to house the elongated portion 7B of signaller 7, and may be provided with a throat 11 for housing an O-ring 11 cooperating by friction with the elongated portion 7B, whose utility will be clarified hereinafter.

The calibration cap 9 is equipped with at least one stop 9A, which can be the free end of a peripheral cylindrical wall of the cap itself. When the stop 9A abuts on a portion of the cup-shaped body 2, the cap itself limits a further screwing of the pre-loading ring nut 8, thus determining the pressure above which a movement of the mobile element is allowed, which causes the intervention of the indicator.

Advantageously, ring nut 8 and cap 9 are removably axially constrained, such as constrained by a snap coupling formed by teeth 15 that engage elastically below the ring nut 8.

To complete the description of cap 9, it should be noted that it may comprise a surface adapted to cooperate with a clamping tool, such as a double lateral flattening 50 at the free end thereof.

Figure 9:
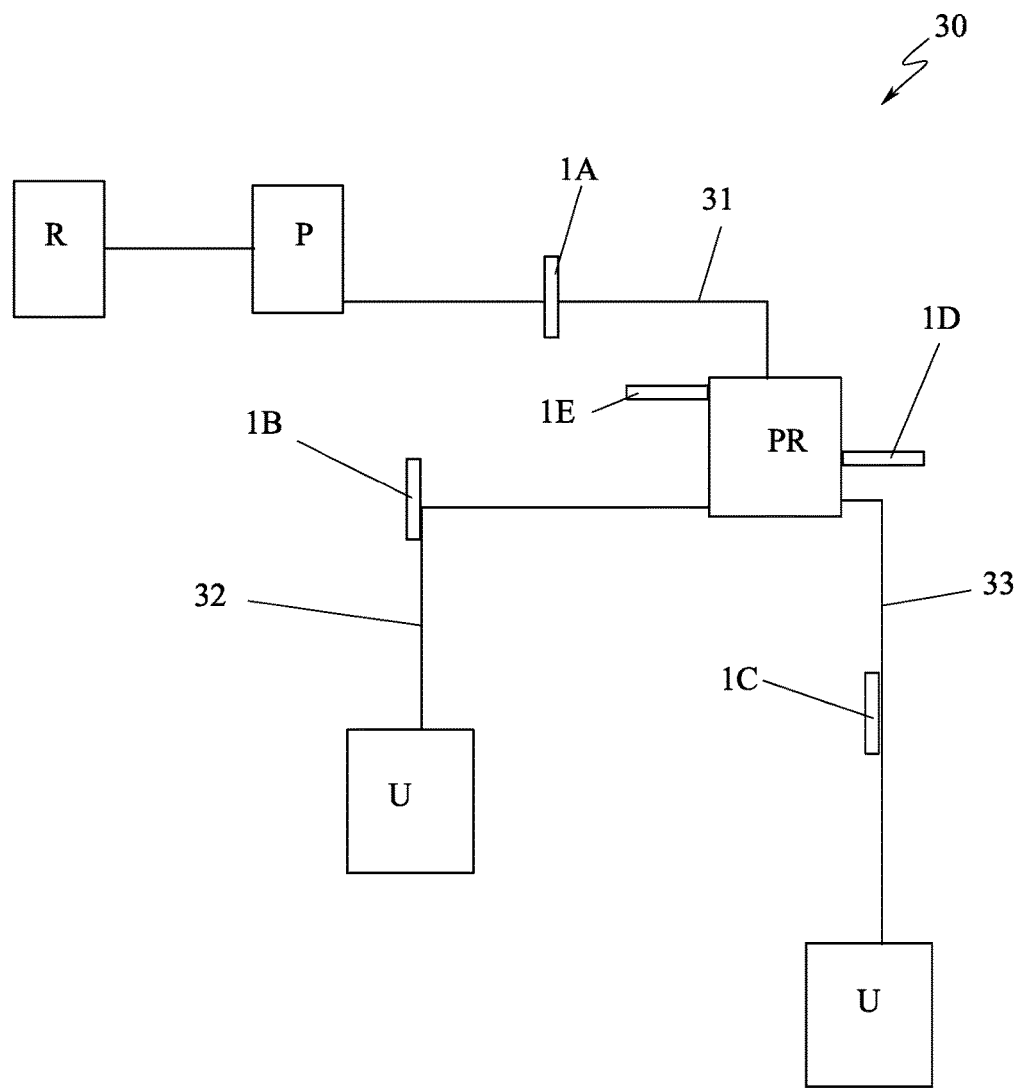
FIG. 9 schematically shows a lubrication system where the indicator in FIG. 1 can be installed.

The indicator described above can be effectively installed in a lubrication system 30 like the one shown in FIG. 9. It may comprise a tank R for the storage of lubricant (such as oil or grease, if it is good for such high pressures), from which a high pressure pump P draws. A pipe 31 connects a delivery of pump P to a distributor PR, such as of the progressive type.

The distributor forwards the oil received from the main pump to various utilities U, each connected by a further pipe or line 32, 33. An indicator 1A, 1B, 1C as described is installed on pipes 31, 32, 33.

An indicator 1D, 1E identical to that described and calibrated with the appropriate pressure may also be installed directly on distributor PR.

The operation of the invention is clear to the man skilled in the art and is substantially as follows.

After setting up the system, on the pipes for which monitoring the pressure is useful, one or more indicators 1 are sealingly installed, for example by screwing them in appropriate threaded holes provided on the pipes by means of thread 20.

It should be noted that the indicators installed may be initially without calibration caps 9.

Figure 4:
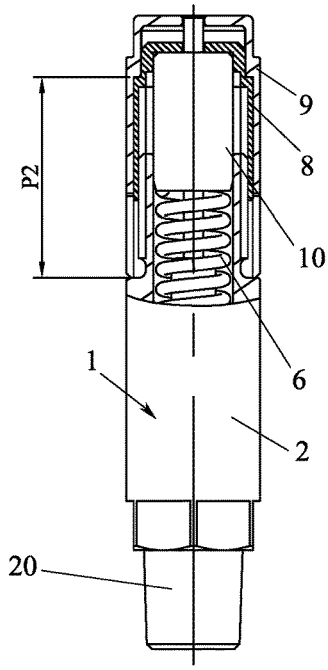
Figure 5:
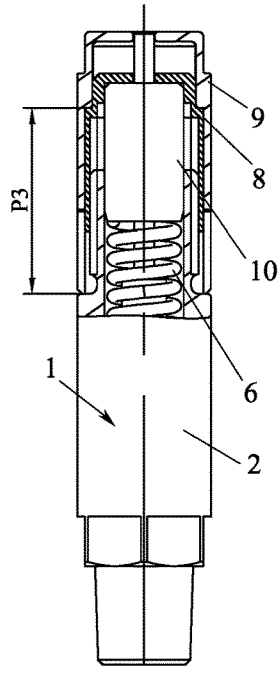
Figure 6:
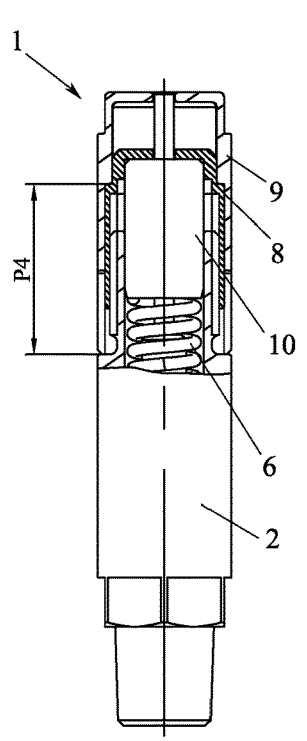
Figure 7:
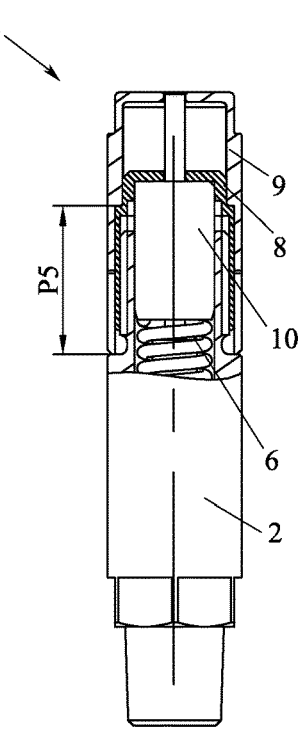

Once the system has been tested in operating conditions (or with the aid of the design data), the appropriate calibration caps are installed on the indicators to indicate the maximum allowable pressure in the tube associated with each indicator. So, for example, for the pipe 31, the signaller's intervention is required when the pressure exceeds 100 bar. Cap 9 in FIG. 4 is then selected, which loads the spring 6 so as to make the indicator intervene at such pressure P2. The cap is positioned on the ring nut 8, aligned with recess 40, and is pushed until it snaps onto the same through teeth 15. It is then rotated (in the screwing direction of the ring nut, for example with a tool that engages the flattening 50) until stop 9A goes in abutment against the cup-shaped body 2, specifically against a shoulder 2S made on the latter. At this point, the spring is accurately pre-loaded and allows a movement of the mobile element 5 only when the pressure is higher than 100 bar.

From the sequence of drawings in FIGS. 3-8, it is seen that each cap has a distance P1-P9 between stop 9A and a surface S where cap 9 abuts on the ring nut 8, which is optimized to provide a desired pre-load to spring 9.

For example, as already explained, distance P2 of the insert in FIG. 4 is optimized to pre-load the spring so as to make the indicator intervene at a pressure of 100 bar.

An important advantage of the indicator described is that as long as the pressure does not exceed the calibration value, the mobile element 5 remains perfectly still. This extends the life of the indicator itself, since there is no wear on seal 51 and bush 14.

Figure 8:
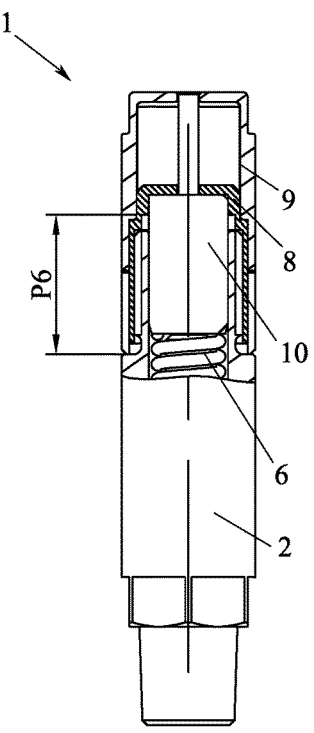

The cap in FIG. 8, for example, has a distance P6 between the stop 9A and the surface S, such as to compress the spring 6 in order to make the indicator intervene at a pressure of 500 bar, and so on with all the others in the figures not described in detail.

Advantageously, in order to simplify the selection work of the interchangeable calibration cap 9 (and thus of the intervention pressure) desired, each cap 9 adapted for a certain pressure may have a different colour (e.g. of the metal or plastic of which it is made).

Of course, each cap 9 may have printed thereof, or engraved or printed, silkscreen-printed etc, the value of the intervention pressure associated to that particular calibration cap.

In essence, a method has been described to set the intervention pressure of an indicator, comprising the step of:
a. selecting the cap suitable for the desired pressure and
b. screwing the cap fully onto the cup-shaped body.

When installing the cap, the user can choose to configure the indicator making it assume a configuration with or without memory. The operation is extremely simple.

If a memory effect is not desired, and then the indicator intervention is limited to the time in which the pressure detected exceeds the calibration, the O-ring 12 is not positioned into throats 11 of the thrust insert 10. In this way, the indicator takes the configuration in FIG. 2 only at the moment in which the pressure in the associated tube exceeds the pre-set value of the cap.

When the pressure in the tube decreases, signaller 7, resting on the piston, falls within the signaller and the indicator switches to the 'non-intervention' position in FIG. 1.

If one wants to use an indicator with memory effect, the O-ring is placed into throat 11 (not shown for simplicity in FIGS. 3-8). In this way, once the indicator has intervened and the configuration is that in FIG. 2, the return of the signaller to the stand-by position is prevented by the friction that is present between the elongated portion 7B of the indicator and the O-ring 12. In this way, the signaller remains in the raised configuration of intervention, even if the mobile element 5 lowers as a result of a return of the pressure inside the tube within the limit calibration values.

In order to 'reset' the indicator it is sufficient to manually push signaller 7 projecting from the cap to the lowered position, mechanically acting on it.

Advantageously, the indicator may be sold in a kit comprising an indicator according to one or more of the previous claims, and at least one additional interchangeable calibration cap equipped with a stop 9A and a surface S configured to obtain an intervention pressure different from that of the first calibration cap.

Even more advantageously, the kit may include multiple calibration caps in a predetermined range of pressures. So, for example, all the six caps in FIGS. 3 to 8 may be provided, which allow calibrating the indicator in a pressure range of 50 bar, 100 bar, and from 100 to 500 bar (the latter, with 100 bar steps). Of course, these range can be adapted to suit all requirements, for example with 50 bar steps.

To complete the description, it should be noted that indicator 1 can be interfaced with an electronic pressure detection system. Thus, body 2 (or the cap) may be provided with notches 60 (or other suitable fastening means, such as a thread, etc.) for coupling with an electronic motion detection system of signaller 7. In its simplest form, the detection system is a simple switch activated by indicator 7 itself when it protrudes from the cap (as in the position in FIG. 2).

Moreover, indicator 7 (and particularly its core 7A) may be magnetized so that it is returned back towards the mobile element 5 when it is lowered. Of course, the magnetization will be calibrated to exert on the indicator a force smaller than that exerted by any O-rings 11, giving the memory effect to the indicator.

In the absence of the O-ring 11, therefore, the indicator will work effectively even oblique or upside down.

Of course, it should be noted that any magnetization of core 7A (or of the mobile element 5 or both) may be replaced by any other element adapted to return core 7A in contact with the mobile element 5, when there the O-ring 11 is not provided.

Various embodiments of the invention have been described but others may be conceived using the same innovative concept.

The invention claimed is:

1. An over-pressure indicator, comprising
a cup-shaped body having, on its bottom, a hole inside which is sealably housed a mobile element loaded by a spring towards the bottom of the cup-shaped body,
the mobile element facing a sensitive part of the indicator intended to communicate with an area where it is wanted to verify the pressure,
the mobile element being coupled with a signaller of a movement thereof,
the spring being pressed by a pre-loading ring nut screwed onto the cup-shaped body,
the pre-loading ring nut being torsionally coupled in a removable manner with an interchangeable calibration cap of the indicator,
the interchangeable calibration cap having a surface that abuts on the ring nut and at least one stop that, when it abuts against a portion of the cup-shaped body, limits a further screwing of the pre-loading ring nut thus determining the pressure beyond which a movement of the mobile element is allowed, said movement causing intervention of the indicator, so that, by coupling the interchangeable calibration cap having the stop and the surface configured to set the desired intervention pressure with the indicator and screwing the cap in fully, setting the desired intervention pressure of the indicator is possible.

2. The indicator according to claim 1, wherein the signaller comprises a core housed inside the spring and in contact, at least in a rest position, with said mobile element, the core having an elongated portion that, at least when the indicator is in an intervention condition, projects from the cap passing through the ring nut.

3. The indicator according to claim 1, wherein between the ring nut and the spring a thrusting insert is arranged, the thrusting insert having a throat for housing an O-ring cooperating by friction with the elongated portion that passes through the insert, to lock the signaller in a raised intervention position, even in the absence of contact between the core and the mobile element.

4. The indicator according to claim 1, wherein the mobile element has a stem that, at an end thereof inside the cup shaped element, has a piston on which the spring rests.

5. The indicator according to claim 4, wherein the stem is guided by a bush fixed at said sensitive part of the indicator.

6. The indicator according to claim 5, wherein the seal between the stem and the bottom is obtained through an O-ring arranged between said bottom and said bush.

7. The indicator according to claim 1, wherein the ring nut and the calibration cap are axially constrained through a snap coupling.

8. The indicator according to claim 1, wherein the calibration cap comprises a surface adapted to cooperate with a clamping tool.

9. The kit comprising an indicator according to claim 1, and at least one additional interchangeable calibration cap equipped with a stop and a surface configured to obtain an intervention pressure different from that of the first calibration cap.

10. The method for setting the intervention pressure of an indicator according to claim 1 comprising the step of:
a. selecting the interchangeable calibration cap with the stop and the surface configured to obtain the desired intervention pressure of the indicator and
b. screwing the cap fully onto the cup-shaped body.

11. The method according to claim 10, wherein the signaller comprises a core housed inside the spring and in contact, at least in a rest position, with said mobile element, the core having an elongated portion that, at least when the indicator is in an intervention condition, projects from the cap passing through the ring nut.

12. The method according to claim 1, wherein between the ring nut and the spring a thrusting insert is arranged, the thrusting insert having a throat for housing an O-ring cooperating by friction with the elongated portion that passes through the insert, to lock the signaller in a raised intervention position, even in the absence of contact between the core and the mobile element.

13. The method according to claim 1, wherein the mobile element has a stem that, at an end thereof inside the cup shaped element, has a piston on which the spring rests.

14. The method according to claim 13, wherein the stem is guided by a bush fixed at said sensitive part of the indicator.

15. The kit comprising an indicator according to claim 2, and at least one additional interchangeable calibration cap equipped with a stop and a surface configured to obtain an intervention pressure different from that of the first calibration cap.

16. The kit comprising an indicator according to claim 3, and at least one additional interchangeable calibration cap equipped with a stop and a surface configured to obtain an intervention pressure different from that of the first calibration cap.

17. The indicator according to claim 2, wherein the mobile element has a stem that, at an end thereof inside the cup shaped element, has a piston on which the spring rests.

18. The indicator according to claim 3, wherein the mobile element has a stem that, at an end thereof inside the cup shaped element, has a piston on which the spring rests.

* * * * *